US008482412B2

(12) United States Patent
Majoros et al.

(10) Patent No.: US 8,482,412 B2
(45) Date of Patent: Jul. 9, 2013

(54) DATA INTERFACE PROCESS WITH RFID DATA READER GLOVE

(75) Inventors: Anthony E. Majoros, Cypress, CA (US); Brian C. Fredgren, St. Peters, MO (US); Paul Robert Davies, Los Angeles, CA (US); Robert Daniel Kalinowski, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 718 days.

(21) Appl. No.: 12/252,984

(22) Filed: Oct. 16, 2008

(65) Prior Publication Data

US 2010/0097195 A1 Apr. 22, 2010

(51) Int. Cl.
*G08B 13/14* (2006.01)
*H04Q 5/22* (2006.01)
*G08B 23/00* (2006.01)
*B25B 23/159* (2006.01)

(52) U.S. Cl.
USPC ............... 340/572.1; 340/10.6; 340/10.41; 340/10.1; 340/573.1; 81/479

(58) Field of Classification Search
USPC ............ 340/10.6, 10.41, 10.1, 573.1
See application file for complete search history.

(56) References Cited

U.S. PATENT DOCUMENTS

| 6,681,638 | B2 | 1/2004 | Kazerooni et al. |
| 7,192,137 | B2 | 3/2007 | Ishibashi et al. |
| 7,242,293 | B2 | 7/2007 | Rea et al. |
| 7,768,409 | B2 | 8/2010 | Parias |
| 7,818,910 | B2 | 10/2010 | Young |
| 7,837,112 | B2 | 11/2010 | An |
| 7,878,030 | B2 | 2/2011 | Burr |
| 7,978,075 | B2 | 7/2011 | Kim et al. |
| 2002/0178830 | A1* | 12/2002 | Kazerooni et al. ............. 73/760 |

(Continued)

FOREIGN PATENT DOCUMENTS

| FR | 2761790 | A1 | 10/1998 |
| FR | 2761790A1 | A1 | 10/1998 |
| WO | WO2008070634 | A1 | 6/2008 |
| WO | WO2008070634 | A1 | 6/2008 |

OTHER PUBLICATIONS

O'Connor, "Intel Demos RFID-Enabled Projects", May 17, 2004, RFID Journal Online, pp. 1-2 http://www.rfidjournal.com/article/articleview/946/1/1/.

(Continued)

*Primary Examiner* — George Bugg
*Assistant Examiner* — Jack K Wang
(74) *Attorney, Agent, or Firm* — Yee & Associates, P.C.

(57) ABSTRACT

In one embodiment, a method and apparatus for reducing time expended on non-value added tasks during assembly of an aircraft is provided. A RFID tag reading function of a RFID tag reader integrated into user apparel is enabled. The RFID tag reader comprises a set of touch activation components integrated into the user apparel. A touch activation component in the set of touch activation components is pressed against a surface in proximity of a RFID tag associated with an aircraft component. The RFID tag reader transmits an interrogate signal to an RFID tag associated with the aircraft component. The user observes a display device coupled to the RFID tag reader integrated into the user apparel, wherein the display device displays RFID tag information received from the RFID tag in response to the interrogate signal. The RFID tag information comprises data describing the aircraft component. The user receives the RFID tag information without interrupting an assembly task.

20 Claims, 6 Drawing Sheets

U.S. PATENT DOCUMENTS

| | | | |
|---|---|---|---|
| 2005/0225867 A1* | 10/2005 | Ishibashi et al. | 359/630 |
| 2006/0044112 A1* | 3/2006 | Bridgelall | 340/10.1 |
| 2007/0008152 A1* | 1/2007 | Parias | 340/573.1 |
| 2007/0120682 A1* | 5/2007 | Rea et al. | 340/572.8 |
| 2008/0071429 A1* | 3/2008 | Kraimer et al. | 701/2 |
| 2008/0115636 A1* | 5/2008 | DeRose et al. | 81/479 |
| 2008/0143080 A1* | 6/2008 | Burr | 280/495 |
| 2009/0179739 A1* | 7/2009 | Kim et al. | 340/10.1 |
| 2009/0243854 A1* | 10/2009 | Scheid et al. | 340/572.1 |
| 2009/0272811 A1* | 11/2009 | An | 235/462.44 |
| 2009/0287363 A1* | 11/2009 | Young | 701/2 |
| 2010/0026484 A1* | 2/2010 | King et al. | 340/539.11 |

OTHER PUBLICATIONS

Fishkin et al., "Hands-On RFID: Wireless Wearables for Detecting Use of Objects", Proceedings of the 2005 Ninth IEEE International Symposium on Wearable Computers (ISWC'05), 2005 IEEE, pp. 1-4.

Dipietro et al., "A Survey of Glove-Based Systems and Their Applications", IEEE Transactions on Systems, Man and Cybernetics—Part C: Applications and Reviews, vol. 38, No. 4, Jul. 2008, pp. 461-482.

GB search report dated Oct. 8, 2009 regarding application GB0909932.6, reference P106691GB00, applicant The Boeing Company, 3 pages.

Gramer et al., "Embedded Sensors for Measuring Surface Regression," NASA Tech Briefs, Jul. 2006, pp. 6-7.

Fitzmaurice et al., "Sentient Data Access via a Diverse Society of Devices," Queue—Instant Messaging Magazine, vol. 1, Issue 8, Nov. 2003, pp. 52-62.

Hamrita et al., "Advances in Smart Sensor Technology," Conference Record of the 2005 Industry Applications Conference, Fourtieth IAS Annual Meeting, vol. 3, Oct. 2005, pp. 2059-2062, abstract accessed Feb. 7, 2013 http://ieeexplore.ieee.org/xpl/loginIsp?tp=&amumber=1518731&url=http%3A%2P/02Fieeexplore.ieee.org%2Fie15%2F10182%02F32507%2F01518731.pdf%3Farnumber%03D1518731.

"Hitachi Develops Finger Vein Authentication Technology for Steering Wheels," Hitachi, Ltd. Press Release, Oct. 22, 2007, 3 pages, accessed Feb. 7, 2013 http://www.hitachi.us/about/press/2007/102207.html.

Mazzone et al., "Novel Actuators for Haptic Displays based on Electroactive Polymers," Proceedings of the ACM Symposium on Virtual Reality Software and Technology, Jan. 2003, 9 pages.

"New Jersey Institute of Technology to Develop Smart Coating for U.S. Army," Nanotechwire.com, Nov. 2002, 2 pages, retrieved Feb. 7, 2013 http://nanotechwire.com/NEWS.ASP?NID=500.

O'Connor, "Intel Demos RFID-Enabled Projects," RFID Journal Online, May 2004, 2 pages, accessed Feb. 7, 2013 http://www.rfidjournal.com/article/articleview/946/1/1/.

"Operational Sense and Respond Logistics: Coevolution of an Adaptive Enterprise Capability," Office of Force Transformation, Department of Defense, May 2004, 21 pages.

Ott, "Maintenance Executives Seek Greater Efficiency," Aviation Week & Space Technology, vol. 142, issue 20, May 1995, pp. 43-44, abstract accessed Feb. 6, 2013 http://connection.ebscohost.com/c/articles/9506071125/maintenance-executives-seek-greater-efficiency.

Riezenman, "Haptics Takes Hold," The Institute, IEEE, Mar. 2008, 2 pages, accessed Feb. 7, 2013 http://theinstitute.ieee.org/technology-focus/technology-topic/haptics-takes-hold146.

Sailor et al., "'Smart dust': nanostructured devices in a grain of sand," Chemical Communications, Issue 11, Jan. 2005, pp. 1375-1383, abstract retrieved Feb. 7, 2013 http://www.ncbi.nlm.nih.gov/pubmed/15756310.

"The Technology Timeline. (Visions)," The Futurist, Jul. 2002, 3 pages, accessed Feb. 7, 2013 http://web.archive.org/web/20110309144540/http://www.allbusiness.com/professional-scientific/scientificresearch/234020-1.htm.

Zunino et al., "U.S. Army Development of Active Smart Coatings System for Military Vehicles," Technical Proceedings of the 2005 NSTI Nano Science and Technology Institute Nanotechnology Conference and Trade Show., vol. 3, pp. 387-390.

* cited by examiner

DATA INTERFACE PROCESS WITH RFID DATA READER GLOVE

BACKGROUND INFORMATION

1. Field

The present disclosure relates generally to radio frequency identification and in particular to radio frequency identification enabled maintenance tools. Still more particularly, the present disclosure relates to a method and apparatus for using a glove enabled with radio frequency identification and a data interface to obtain maintenance information.

2. Background

During performance of a manufacturing, repair, maintenance, testing, and/or inspection task on a device, such as, without limitation, an automobile or an aircraft, a technician frequently needs to review component information and other technical data associated with the device and the particular task being performed on the device. Technicians frequently use their specialized knowledge of the physical appearance of a component to locate a part name, part number, or other technical information in computer files, paper files, or microfiche files.

Currently, many industries are increasing the utilization of radio frequency identification (RFID) tags to provide component information to technicians. The component information may include, without limitation, part numbers, part descriptions, and other information associated with manufacture, maintenance, repair, and replacement of components. The term component may refer to a single part, an assembly, a component, or a set of subparts in a device. Information stored in RFID tags may be used, without limitation, to identify components, such as subassemblies and replaceable units on aircraft, as well as encode part information and the status of components.

Conventionally, accessing data available from RFID tags requires a user to utilize a RFID tag reader. A RFID tag reader may be a hand held device that is used to read information from RFID tags and display the information on a display screen. Operating the RFID tag reader generally requires the user to discontinue performing any task that requires the use of the user's hands so that the user is able to hold and operate the handheld RFID tag reader. Operating a RFID tag reader is typically not integrated into the normal flow of actions that add value to workpieces. Instead, operating an RFID tag reader is similar to using a meter to test voltage, in that setting up, using, then stowing the meter is a time-consuming act that yields information but does not add value to the object being tested. In the same way, reading RFID tags is considered non-value added work because accessing RFID tag information does not add value to a component by preparing, assembling, servicing, replacing, aligning, or preparing the component for its ultimate function.

The use of RFID tags in aircraft manufacturing and maintenance is increasing, and as processes begin to incorporate and depend on the information in these tags, a new demand is placed on technicians to read these RFID tags. For example, RFID tags are read to verify a component's serial number or applicability/suitability for a given aircraft, or to associate the component with data systems such as inventory, quality control, illustrated parts breakdown, or other technical information. Thus, increasing amounts of a technician's time is spent in performing the non-value added work of reading RFID tags. These non-value-added efforts frequently consume a significant portion of a technician's time.

To reduce the time consumed in information-related, non-valued-added, aspects of their work, technicians may employ task planning in the tradition of industrial engineering and industrial psychology and/or employ various electronic devices, such as radios, cell phones, handheld computers, handheld RFID tag readers, and input devices, such as light pens. Some efficiency may be gained by the use of smaller and lighter handheld RFID readers, because these compact devices may require less time to operate than larger handheld RFID tag readers.

However, even small and light handheld RFID tag readers require a user to discontinue value added tasks in order to pick up, operate, and set down the device before returning to the performance of value added tasks. Thus, handheld RFID tag readers, regardless of size, still result in consuming a user's time in non-value added tasks. Thus, it would be advantageous to have a method and apparatus to reduce the time required for reading tags and to integrate the action of tag reading into the sequence of a user's value-added performance.

SUMMARY

One advantageous embodiment of the present disclosure provides a method for reducing time expended on non-value added tasks during assembly of an aircraft. A RFID tag reading function of a RFID tag reader integrated into user apparel is enabled. The RFID tag reader includes a set of one or more touch activation components integrated into the user apparel. A touch activation component is pressed against a surface in proximity of a RFID tag associated with an aircraft component. The RFID tag reader transmits an interrogate signal to the RFID tag associated with the aircraft component after the touch activation component is pressed against the surface. The user observes a display device coupled to the RFID tag reader integrated into the user apparel, wherein the display device displays RFID tag information received from the RFID tag in response to the interrogate signal. The RFID tag information comprises data describing the aircraft component. The user receives the RFID tag information without interrupting an assembly task.

Another advantageous embodiment provides a method of performing maintenance on a device. A RFID tag reading function of a RFID tag reader integrated into a glove is enabled. The RFID tag reader comprises a touch activation component integrated into the glove. A touch activation component in the set of touch activation components is pressed against a surface to activate a ready-to-read contact event. In response to pressing the touch activation component against the surface, the RFID tag reader transmits an interrogate signal to the RFID tag associated with the component. A user observes a display device. The display device displays RFID tag information received from the RFID tag in response to the interrogate signal, and wherein the RFID tag information comprises maintenance data associated with the component. The user receives the RFID tag information without interrupting a maintenance task and performance of value-added tasks.

In still another advantageous embodiment, a method for tracking aircraft components is provided. A RFID tag reading function of a RFID tag reader integrated into user apparel is enabled. The RFID tag reader comprises a set of touch activation components integrated into the user apparel. A touch activation component in the set of touch activation components is pressed against a surface in proximity of a RFID tag associated with an aircraft component. The RFID tag reader transmits an interrogate signal to the RFID tag associated with the aircraft component when the touch activation component is pressed against the surface. The user observes a display device coupled to the RFID tag reader. The display device displays RFID tag information received from the RFID tag in response to the interrogate signal. The RFID tag information indicates whether the aircraft component is in an acceptable location or an unacceptable location without interrupting performance of a value-added task.

In yet another embodiment, a RFID data reading glove system is provided. The RFID data reading glove system comprises a set of RFID tag readers integrated into a glove; a power source; a set of touch activation components integrated into a set of fingertips of the glove, an antenna, a network interface, and a display device. A touch activation component in the set of touch activation components is activated when a user touches a surface in proximity to a set of RFID tags associated with a device component during performance of a value-added maintenance task associated with the device component. The antenna transmits an interrogate signal to the set of RFID tags associated with a device component in response to the user touching the surface with the touch activation component. The network interface transmits a response signal received from the set of RFID tag readers to a computing device for processing, and wherein a result of processing the response signal comprises RFID tag information. The display device presents the RFID tag information to a user performing the value-added maintenance task. The user receives the RFID tag information without interrupting performance of the value-added maintenance task.

The RFID data reader glove reduces the time a user spends reading RFID tags and integrates the action of reading RFID tags into the sequence of a user's value-added performance. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
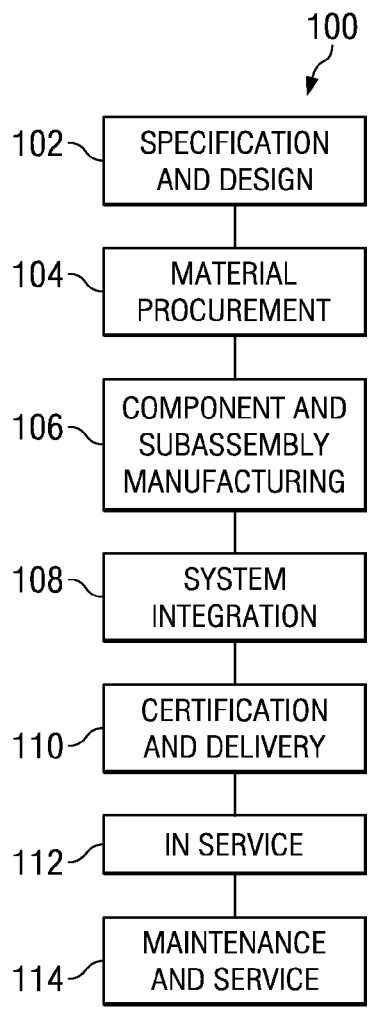
FIG. 1 is a diagram illustrating an aircraft manufacturing and service method in which an advantageous embodiment may be implemented.
Figure 2:
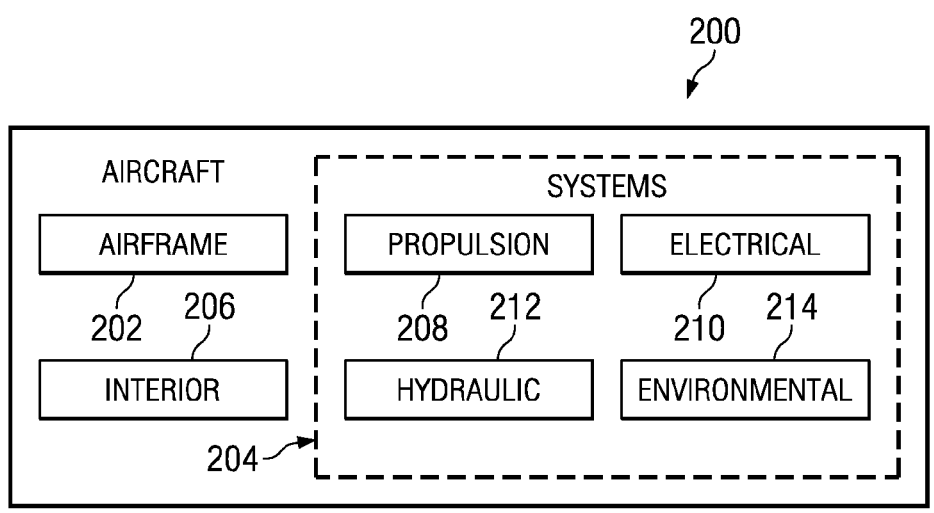
FIG. 2 is a block diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Although the embodiments are described in the context of aircraft and aircraft manufacturing, the embodiments may be used with any type of device, such as without limitation, automobiles, trucks, ships, boats, manufacturing equipment, aerospace vehicles, construction vehicles, or any other type of device. Moreover, the embodiments are not limited to manufacturing tasks. The embodiments may be used during performance of any type of task on the device, such as, without limitation, construction, maintenance, repair, testing, inspection, calibration, upgrading, or any other task performed on the device.

Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service. As used herein, the term maintenance is not limited to maintenance. The term maintenance refers to manufacturing, assembling, testing, inspecting, repairing, refurbishing, replacing, upgrading, and/or maintaining.

Each of the processes of aircraft manufacturing and service method 100 may be performed or carried out by a system integrator, a third party, and/or an operator. In these examples, the operator may be a customer. For the purpose of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry, construction industry, manufacturing industry, aerospace industry, boating industry, or any other industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The advantageous embodiments recognize that the ratio of value-added to non-value-added labor in work shifts is particularly acute in aircraft maintenance, where almost half of a technician's time can be expended on non-value added information-related tasks, such as reading RFID tags.

With existing handheld readers, obtaining a part name, number, or status is not an action that is associated with the part itself, but instead is an action associated with the separate operation of a device or devices. Currently available handheld RFID tag readers require a distinct operation that interrupts a technician's touch labor. Small and light handheld RFID tag readers with effective user interfaces still require a user to pick up, operate, and set down the device. Furthermore, the handheld RFID tag reader solution is self-limiting because handheld RFID tag readers that are excessively miniaturized would take more time to operate than an optimally sized reader.

Therefore, the advantageous embodiments recognize that methods are needed to reduce the time required for reading tags and to integrate the action into the sequence of a technician's value-added performance. In one advantageous embodiment, a method and apparatus for reducing time expended on non-value added tasks during assembly of an aircraft is provided. A RFID tag reading function of a RFID tag reader integrated into user apparel is enabled. The RFID tag reader comprises a set of touch activation components integrated into the user apparel. As used herein, the term "set" refers to one or more. Thus, a set of touch activation components may include a single touch activation component, as well as two or more touch activation components. A touch activation component is any type of device that senses contact with the surface to reset the reading function of the RFID tag reader and allow the RFID tag reader to read the nearest RFID tag available to be read. For example, the touch activation component may be implemented as, without limitation, a touch sensor, a pressure sensor that is activated when pressure is applied to the pressure sensor, a fabric switch embedded in the fabric of the user apparel, a physical switch that is activated when force is applied to the switch, such as, but not limited to, a switch with a threshold for force of contact, or a simple micromechanical switch in a fingertip of the glove.

This reset and 'ready to read' function operates after the overall system is turned on. Thus, once the RFID tag reader system associated with the user apparel, such as a glove, is turned on, the technician merely touches any surface or even touches two fingers together to invoke the 'ready to read' mode, and after a tag is read and a number obtained/displayed, the system goes into a state wherein it waits for another 'ready to read' contact event.

A touch activation component in the set of touch activation components is pressed against a surface in proximity of a RFID tag associated with an aircraft component. The surface may be the RFID tag itself, a surface of the component, a work surface, such as a table, the user's hand, the user's thumb, a wall, the floor, or any other surface.

The RFID tag reader transmits an interrogate signal to the RFID tag associated with the aircraft component after the touch activation component is pressed against the surface. The user observes a display device coupled to the RFID tag reader integrated. The display device may be integrated into the glove, although it is more practical to consider that the display would be in a somewhat protected position, such as on the inside of the wrist on the gauntlet of a glove. The display device displays RFID tag information received from the RFID tag in response to the interrogate signal. The RFID tag information comprises data describing the aircraft component. The user receives the RFID tag information without interrupting an assembly task.

In still another advantageous embodiment, a method for tracking aircraft components is provided. A RFID tag reading function of a RFID tag reader integrated into user apparel is enabled. The RFID tag reader comprises a set of touch activation components integrated into the user apparel. A touch activation component in the set of touch activation components is pressed against a surface in proximity of a RFID tag associated with an aircraft component. The RFID tag reader transmits an interrogate signal to the RFID tag associated with the aircraft component when the touch activation component is pressed against the surface. The user observes a display device coupled to the RFID tag reader. The display device displays RFID tag information received from the RFID tag in response to the interrogate signal. The RFID tag information indicates whether the aircraft component is in an acceptable location or an unacceptable location without interrupting performance of a value-added maintenance task.

A maintenance task may include, without limitation, a manufacturing task, an assembly task, a component testing task, a repair task, a component replacement task, a component inspection task, and a component maintenance task.

In one embodiment, but without limitation, the RFID tag reader system is able to provide location acceptability information because location data is encoded on, and reported by, an RFID tag. The user uses the RFID tag reader system to access data associated with a RFID tag on one component, such as, without limitation, a valve and then inspects data associated with a RFID tag on another different component, such as, without limitation, a pipe or tube carrying fluid. A comparison of the two data sources may reveal whether the valve, in the present example, was properly located. Another advantageous embodiment may include RFID tag information that includes status of a component that has been inspected, an identity, name, or description of a component; and/or authenticity of a component known to be an authorized and authentic (non-counterfeit) component by its serial number or other code.

Figure 3:
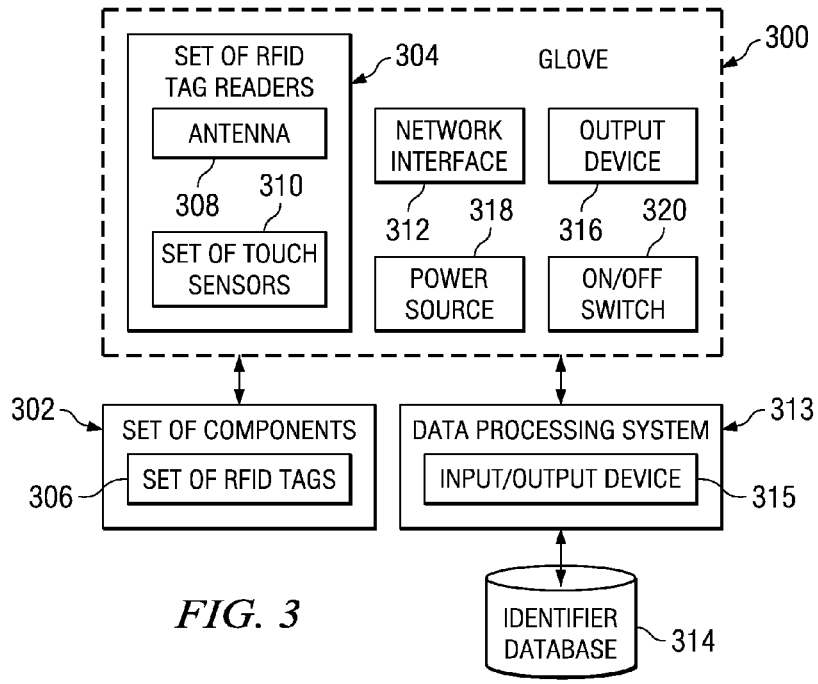
FIG. 3 is a block diagram of a RFID data reader glove system in accordance with an advantageous embodiment.

FIG. 3 is a block diagram of a radio frequency identification enabled glove system depicted in accordance with an advantageous embodiment. Glove 300 is a RFID tag reader enabled glove for the human hand that is fitted with electronics. The glove may be implemented using a leather glove, a cotton glove, a fingerless bicycle type of glove, a rubber glove, a heat resistant asbestos-type glove, or a glove made of any other type of material. Glove 300 also includes at least one RFID tag reader module integrated into glove 300 that enables glove 300 to perform the function of reading radio frequency identification tags on set of components 302 and display technical information received or obtained from RFID tags on an output device.

Set of components 302 is a set of one or more parts, components, and/or assemblies on a device. The device may be any type of aircraft, aerospace device, automobile, truck, construction equipment, manufacturing equipment, robot, heavy machinery, industrial equipment, or any other type of machine or manufactured device. In this example, set of components 302 is a set of parts, components, and/or assemblies on an aircraft, such as aircraft 200 in FIG. 2.

Set of RFID tag readers 304 is a set of one or more RFID tag readers on glove 300. Set of RFID tag readers 304 may be implemented using any type of known or available RFID tag readers, including, without limitation, active RFID tags and/or passive RFID tags.

Glove 300 may be divided into regions or sections of the glove. For example, and without limitation, a first region may be the back of the glove, a second region may be one or more fingers in the glove, another region may be the palm of the glove, and so forth. The tag reader(s) in set of RFID tag readers 304 may be located in one or more different regions of glove 300, such as the fingertips of glove 300, in region of the glove that includes the front or palm of glove 300, the region of the glove that includes the back or prone side of glove 300, the region of the glove that includes the user's wrist, and/or any other region of glove 300. In this embodiment, set of RFID tag readers 304 is without limitation, located on the back of glove 300. Each RFID tag reader is a module containing code for reading RFID tags.

When enabled, a RFID tag reader uses antenna 308 to send out an interrogate signal. When a RFID tag receives the interrogate signal, the RFID tag sends out a response signal. The response signal comprises RFID tag information. The RFID tag information may include, without limitation, a part number (PN), a part description, a part installation date, a date of repair or replacement, a part manufacturer, manufacturer information, or any other information.

A RFID tag reader in set of RFID tag readers 304 may be enabled or activated when a user touches a touch activation component in glove 300 to a RFID tag or touches a surface near a RFID tag. In this embodiment, glove 300 includes set of touch activation components 310. Set of touch activation components 310 is a set of one or more pressure sensors. A pressure sensor may be located on a fingertip on the outside of glove 300, on a fingertip on the inside of glove 300, or on any other location on glove 300. A RFID tag reader in set of RFID tag readers 304 is activated when a touch activation component in set of touch activation components 310 on glove 300 is pressed against a RFID tag or a surface near a RFID tag. In another embodiment, a RFID tag reader may be enabled without pressure sensors. In this embodiment, RFID tag reader sends out interrogate signals either continuously or on periodically to obtain information in a response signal from one or more RFID tags in set of RFID tags 306.

The response signal received from a RFID tag is processed by a computing device to obtain the RFID tag information, such as data processing system 313. Data processing system 313 may be any type of computing device, such as, without limitation, a desk top computer, a laptop computer, a personal digital assistant (PDA), a smart watch. Data processing system may be implemented as a data processing system, such as data processing system 400 in FIG. 4, below. Data processing system 313 in this example is connected to glove 300 by a wired connection or a wireless connection. The response signal may be transmitted to data processing system 313 via the wired or wireless connection by network interface 312.

Network interface 312 is any type of network access software known or available for allowing set of RFID tag readers 304 on glove 300 to access a network. Network interface 312 connects to a network connection, such as network 102 in FIG. 1. The network connection permits access to data processing system 313 over any type of network, such as, without limitation, a local area network (LAN), a wide area network (WAN), an Ethernet, or the Internet.

Data processing system 313 processes the RFID tag response signal to identify the RFID tag information. In one embodiment, the response signal includes an identifier. Data processing system 313 compares the identifier with known identifiers in identifier database 314 to identify the part number, manufacturer, part description, a confirming image of the component, or other RFID tag information.

Input/output device 315 presents the RFID tag information to a user. Input/output device 315 may be any type of device for receiving user input and/or presenting output to the user. Input/output device 315 may include, without limitation, a keyboard, a mouse, a display device, a voice recognition system, a speaker, a tactile output device for the visually impaired, a touch screen, or any other type of input/output device. Input/output device 315 may present the RFID tag information in an audio format, in a visual video format, or in a combination of audio and video.

Input/output device 315 is an input/output device associated with data processing system 313. In another embodiment, the RFID tag information may be presented on output device 316 integrated into glove 300. Output device 316 may be located on glove 300 or on a user's wrist. In yet another embodiment, the RFID tag information may be presented on an output device worn on a user's head, such as an optic shield worn by a user. An optic shield may be safety glasses, goggles, prescription glasses, sun glasses, a visor, a face shield that wholly or partially covers the eyes, or any other device that is worn in front of the eye. An optic shield may cover one eye or both eyes.

Power source 318 is source of power for set of RFID tag readers 304 and/or a source of power for data processing system 313. Power source 318 may include, without limitation, a battery power source, a connection to an electric power grid, a connection to an electric power generator, or any other source of power. A generator may be a gasoline powered generator, a solar powered generator, a wind turbine powered generator, a generator powered by water currents, or any other type of generator. On/off switch 320 is a switch to enable or disable set of RFID tag readers and/or output device.

Thus, glove 300 is fitted with electronics, by which a user obtains RFID tag information, such as, without limitation, the name, number, and/or status of a component. In this example, glove 300 includes, without limitation, a power on/off function enabled by on/off switch 320, an integrated powered RFID reading antenna 308 to read passive RFID tags, a set of touch activation components 310 in the fingertip such that a "switch on" touch allows one tag to be read, a second "switch on" touch allows a second tag reading, and so on.

Glove 300 enables a user to obtain a RFID tag's code or other information that identifies the component to which the tag is attached, by touching or placing his/her gloved hand near the tag. In this manner, glove 300 provides an interface between equipment and a user's apparel, such as the user's glove, which is utilized to retrieve RFID tag information for a component while the user is working on the component. The RFID reading function associated with glove 300 may reduce the proportion of time that technicians devote to non-value added labor in their work shifts.

In another embodiment, the RFID tag information presented to the user is used to determine whether a component is located in an acceptable or correct location. The RFID tag information may include the correct location for the component, as well as the current location of the component. If the current location is not an acceptable or correct location, the RFID tag information presented to the user may include an indication that the component is located in an unacceptable location. In another embodiment, the RFID tag information presented to the user only includes the correct location and/or acceptable locations for the component. The user may then determine if the current location of the component is one of the acceptable locations or an unacceptable location.

Figure 4:
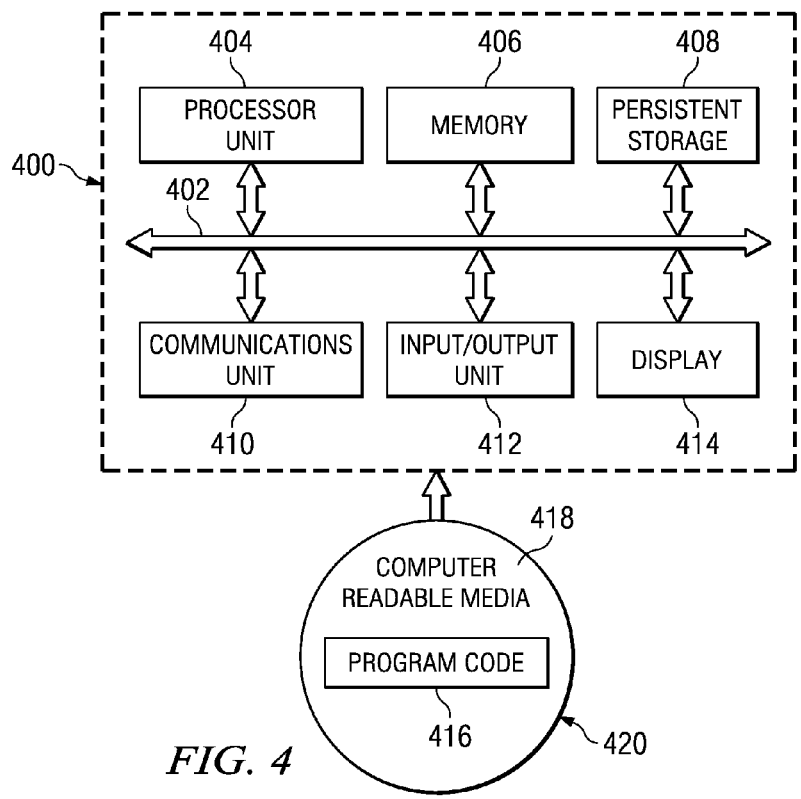
FIG. 4 is a diagram of a data processing system associated with a RFID data reader glove in accordance with an advantageous embodiment.

Turning now to FIG. 4, a diagram of a data processing system associated with a RFID data reader glove is depicted in accordance with an advantageous embodiment of the present invention. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multiprocessor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to, or in place of, those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
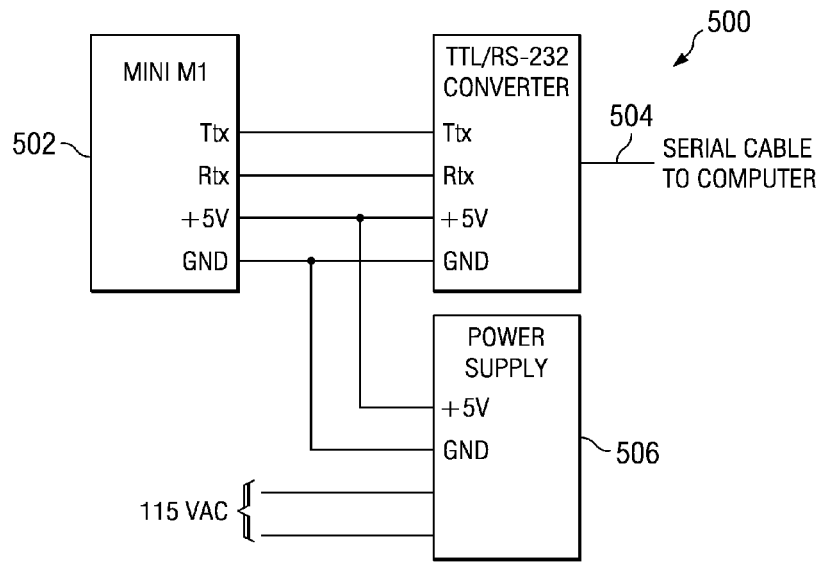
FIG. 5 is a block diagram of basic cable connections in a RFID data reader glove in accordance with an advantageous embodiment.

FIG. 5 is a block diagram of basic cable connections in a RFID data reader glove in accordance with an advantageous embodiment. Basic cable connection diagram 500 is a diagram of cable connections for a RFID data reader glove, such as glove 300 in FIG. 3. RFID tag reader connection 502 connects a set of RFID tag readers to a data processing system 504 and a power supply 506, such as a connection to an electric grid or a battery power supply.

Figure 6:
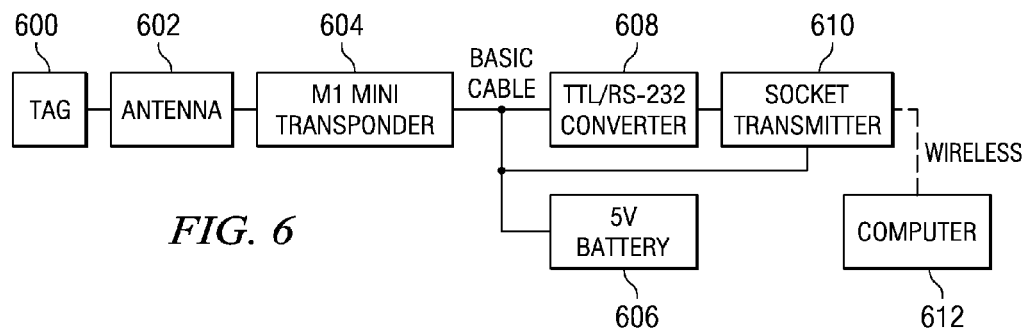
FIG. 6 is a block diagram of a wireless reader associated with a RFID data reader glove in accordance with an advantageous embodiment.

Referring now to FIG. 6, a block diagram of a wireless reader associated with a RFID data reader glove is depicted in accordance with an advantageous embodiment. Tag 600 is a RFID tag on a component, such as a tag in set of RFID tags 306 in FIG. 3. Antenna 602 is an antenna associated with a RFID tag reader, such as antenna 308 in FIG. 3. Antenna 602 may be an integrated powered RFID reading antenna to read passive RFID tags and/or an antenna for reading active RFID tags. Tag reader 604 is a RFID tag reader for reading RFID tags, such as a tag reader in set of RFID tag readers 304 in FIG. 3. In this example, tag reader 604 is an M1 mini transponder type tag reader commercially available from Skyetek, Inc. However, the embodiments are not limited to an M1 mini transponder type RFID tag reader. Any known or available type of RFID tag reader may be used.

Battery 606 is a power source for tag reader 604. In one embodiment, the power source for tag reader 604 may be a connection to an electric power grid instead of or in addition to a battery power source.

Converter 608 is an off-the-shelf converter that converts signals sent from tag reader 604 to computer 612. Socket transmitter 610 transmits data wirelessly to computer 612. Computer 612 may be implemented as any type of computing device, such as, without limitation, data processing system 400 in FIG. 4.

Figure 7:
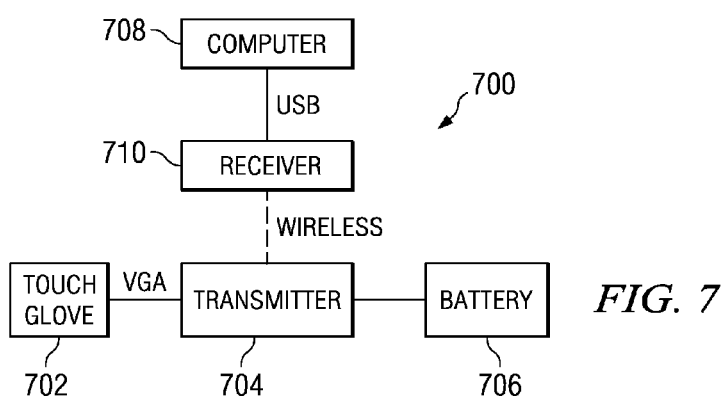
FIG. 7 is a block diagram of a wireless RFID data reader glove in accordance with an advantageous embodiment.

FIG. 7 is a block diagram of a wireless RFID data reader glove in accordance with an advantageous embodiment. Wireless RFID data reading glove 700 is a RFID data reading glove with a wireless connection to a data processing system rather than a wired connection. Glove 702 is a glove having at least one RFID tag reader module and at least one touch activation component in a fingertip of the glove. When a user wearing glove 702 touches a RFID tag with the touch activation component, the RFID tag reader is enabled to read the RFID tag. RFID data reading glove 700, in this example, optionally receives power from battery 706. Battery 706 may be implemented as a lead acid battery, a fuel cell, a hybrid lead acid battery and fuel cell, or any other type of battery. However, RFID data reading glove 700 may receive power from a connection to an electric power grid, a generator, or any other source of power in addition to or instead of receiving power from battery 706.

In this example, transmitter 704 sends a wireless signal to receiver 710 of computer 708. Receiver 710 may be implemented as any type of known or available wireless receiver for receiving touch activation component data from a RFID data reader glove. Receiver 710 receives information from one or more touch activation components in a RFID data reader glove. In one embodiment, receiver 710 uses a wireless protocol to send and receive data from the one or more touch activation components over the wireless connection. Receiver 710 may be connected to computer 708 via a wired USB connection. However, receiver 700 may optionally be connected to computer 708 using any other known or available means for transmitting information from receiver 710 to computer 708.

Figure 8:
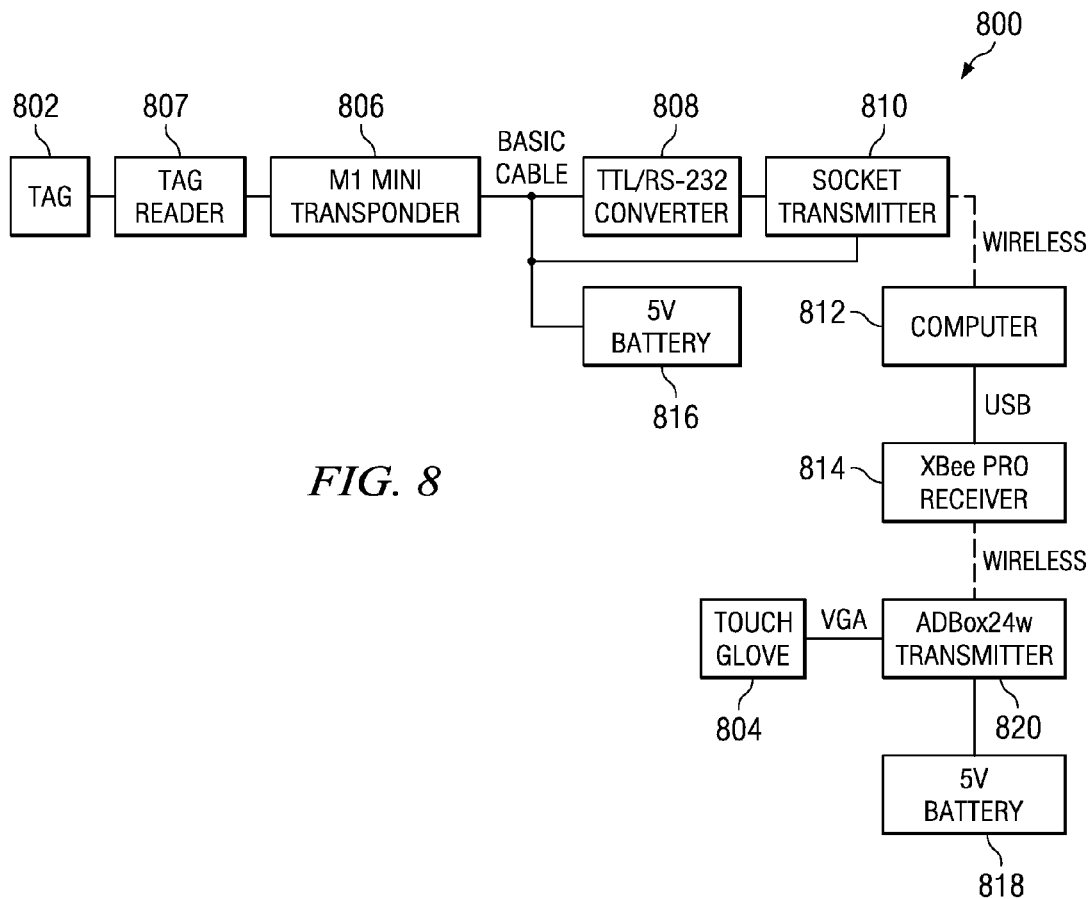
FIG. 8 is a block diagram of a RFID glove in accordance with an advantageous embodiment.

Turning now to FIG. 8, a block diagram of a RFID glove is shown in accordance with an advantageous embodiment. RFID data reading glove system 800 is a combined glove and RFID tag reader. RFID data reading glove system 800 comprises at least one RFID tag 802, and a RFID data reader glove 804. RFID data reader glove 804 comprises at least one RFID tag reader 806. In this example, RFID tag reader 806 is an M1 mini transponder type of RFID tag reader. However, RFID tag reader 806 may be implemented using any type of RFID tag reading device. RFID tag reader 806 includes tag reader 807 for receiving a response signal from RFID tag 802.

Converter 808 is an off-the-shelf converter that converts signals sent from tag reader 802 to computer 812. Socket transmitter 810 transmits data wirelessly to computer 812. Computer 812 may be implemented as any type of computing device, such as, without limitation, data processing system 400 in FIG. 4. Receiver 814 uses a wireless protocol to send and receive data over the wireless connection. Battery 816 is a power source for RFID tag reader 806. Battery 818 is a power source for transmitter 820. Battery 816 and 818 may be implemented as any type of device for storing an electric charge, such as, without limitation, a lead acid battery, a fuel cell, a hybrid lead acid battery and fuel cell, and/or a rechargeable battery. Battery 816 and/or 818 may be implemented with an optional battery pack. For example, and without limitation, if a battery pack is utilized, the battery pack may be clipped or attached to a user's belt or other article of clothing.

Battery 816 and 818 may also be implemented as a connection to an electric power grid or a connection to a generator, rather than a battery or other storage device. Glove 804 uses transmitter 820 to transmit the RFID tag response received from RFID tag 802 to computer 812 over a wireless connection.

Figure 9:
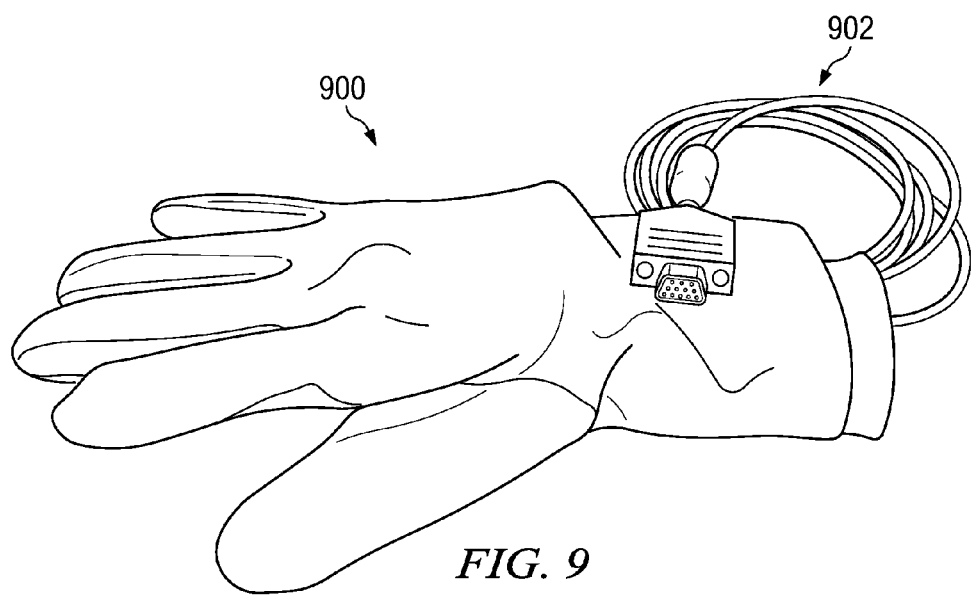
FIG. 9 is a RFID data reader glove with a wired connector in accordance with an advantageous embodiment.

FIG. 9 is a RFID data reader glove with a wired connector in accordance with an advantageous embodiment. Glove 900 is a RFID data reader glove, such as glove 300 in FIG. 3. Glove 900 includes wired connection 902 to connect the RFID tag reader to a socket transmitter on a computer, such as data processing system 400 in FIG. 4.

Figure 10:
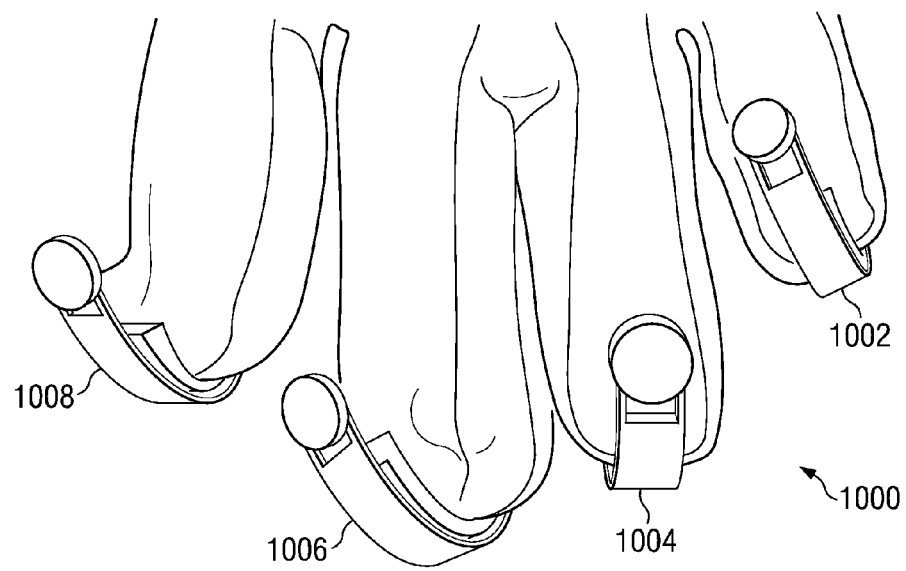
FIG. 10 is a RFID data reader glove with touch activation components in the fingertips in accordance with an advantageous embodiment.

Referring now to FIG. 10, a RFID data reader glove with touch activation components in the fingertips is shown in accordance with an advantageous embodiment. Glove 1000 is a RFID data reader glove comprising a set of touch activation components in the fingertips of glove 1000. A touch activation component is a physical switch device that is activated when the touch activation component is pressed against an object, such as a RFID tag or a surface near a RFID tag.

In this example, the set of touch activation components includes touch activation components 1002-1008. However, glove 1000 may be implemented with a single touch activation component on a single fingertip, two touch activation components on two fingertips, or three touch activation components in three fingertips. FIG. 10 only shows touch activation components in the fingertips of glove 1000. In another embodiment, glove 1000 may also include a touch activation component on the thumb of glove 1000.

Figure 11:
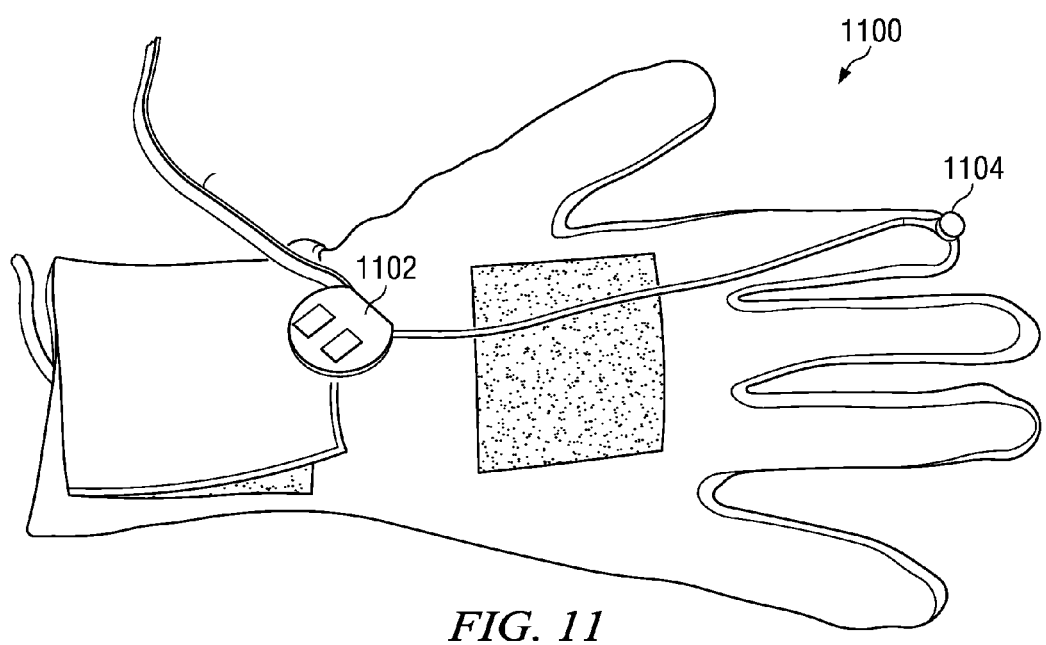
FIG. 11 is a RFID data reader glove with a RFID antenna in accordance with an advantageous embodiment.

FIG. 11 is a RFID data reader glove with a RFID antenna in accordance with an advantageous embodiment. Glove 1100 is a RFID data reader glove comprising a RFID tag reader 1102 and antenna 1104 mounted on glove 1100 to read RFID tags located in proximity to glove 1100. In this embodiment, antenna 1104 is, without limitation, a ceramic antenna in a fingertip placement. However, antenna 1104 may be placed in a different fingertip, on the palm, on the back of the glove, or on the user's wrist. Antenna 1104 is an antenna for transmitting interrogate signals and/or receiving data from one or more RFID tags, such as antenna 308 in FIG. 3.

Figure 12:
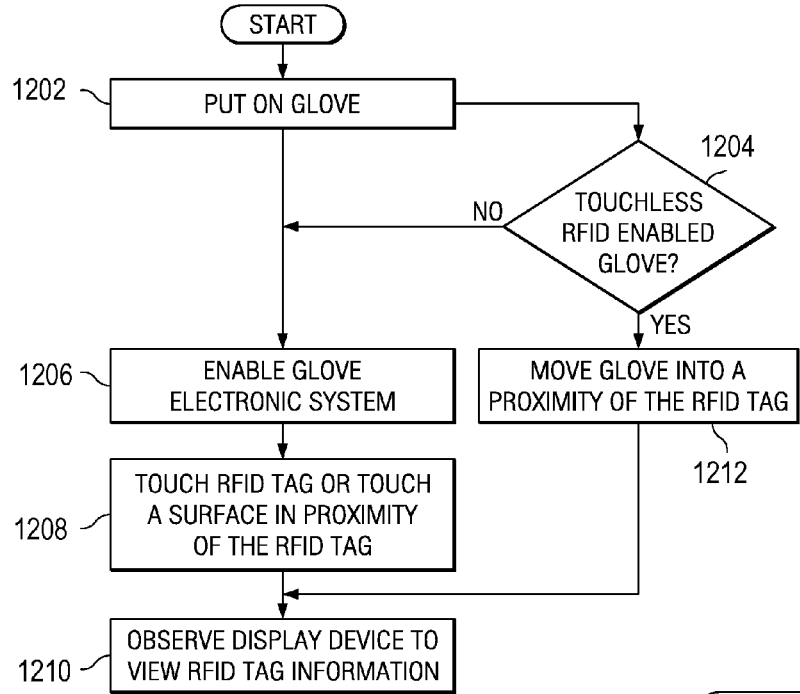
FIG. 12 is a receiver for receiving RFID data from a RFID data reader glove in accordance with an advantageous embodiment.

FIG. 12 is a flowchart illustrating a process for using a RFID data reader glove in accordance with an illustrative embodiment. The process in FIG. 12 is performed by a human user, such as, without limitation, a mechanic, technician, engineer, construction worker, device operator, inspector, or any other user performing maintenance.

The process begins when the user puts on a RFID data reader glove (operation 1202). The user makes a determination as to whether the RFID data reader glove is a touchless RFID reader glove (operation 1204). A touchless RFID reader glove sends out an interrogate signal without requiring the user to press or touch a touch activation component to a surface. If the RFID data reader glove is not a touchless RFID reader glove, the user enables the RFID data reader glove electronic system (operation 1206). The user touches a RFID tag or a surface in proximity to a RFID tag (operation 1208).

The user observes a display device to view RFID tag information (operation 1210) with the process terminating thereafter.

Returning to operation 1204, if the glove is a touchless RFID data reader glove, the user moves the glove into proximity of the RFID tag (operation 1212). The user then observes the display device to view RFID tag information (operation 1210) with the process terminating thereafter.

Figure 13:
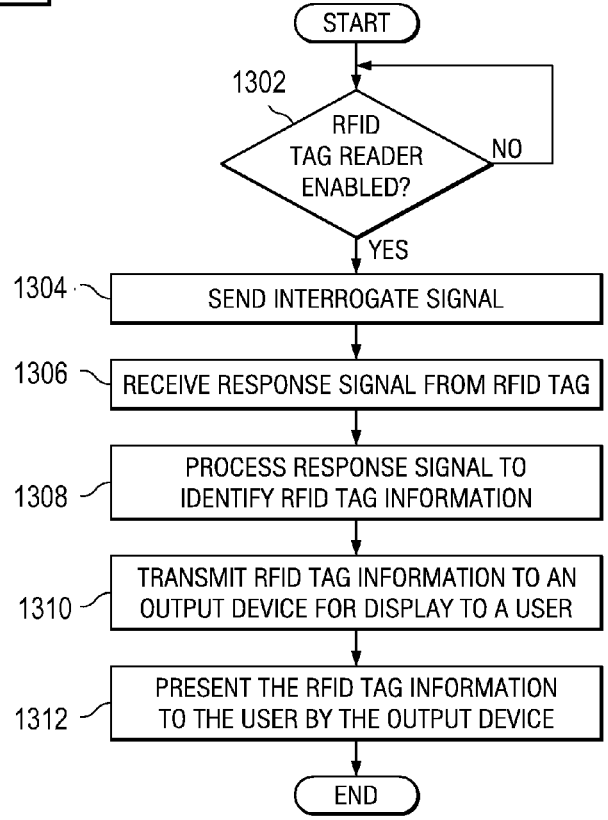
FIG. 13 is a battery pack to power a RFID data reader glove in accordance with an advantageous embodiment.

Referring now to FIG. 13, a process for a RFID data reader glove presenting maintenance information to a user is shown in accordance with an advantageous embodiment. The process in FIG. 13 is implemented by a RFID data reader glove, such as glove 300 in FIG. 3. Operation 1312 may be implemented by an output device. The output device may be coupled to the RFID data reader glove or the output device may be a component that is implemented separately from the RFID data reader glove.

The process begins by making a determination as to whether a RFID tag reader associated with the RFID data reader glove is enabled (operation 1302). In one embodiment, the RFID tag reader is enabled when a user touches a RFID tag or a surface in proximity to a RFID tag with a touch activation component on the glove. In another embodiment, the RFID tag reader is enabled when a user selects an on/off control to turn the RFID tag reader on.

When the RFID tag reader is enabled, the RFID tag reader sends an interrogate signal (operation 1304). The RFID tag reader on the RFID data reader glove receives a response signal from a RFID tag (operation 1306). The RFID data reader glove processes the response signal to identify RFID tag information (operation 1308). The RFID data reader glove transmits RFID tag information to an output device for display to the user (operation 1310). The output device presents the RFID tag information to the user (operation 1312) with the process terminating thereafter.

In one embodiment, a method and apparatus for reducing time expended on non-value added tasks during assembly of an aircraft is provided. A RFID tag reading function of a RFID tag reader integrated into a glove is enabled. The RFID tag reader comprises a set of touch activation components integrated into the user apparel. A touch activation component in the set of touch activation components is pressed against a surface in proximity of a RFID tag associated with an aircraft component. The RFID tag reader transmits an interrogate signal to the RFID tag associated with the aircraft component after the touch activation component is pressed against the surface. The user observes a display device coupled to the RFID tag reader integrated into the user apparel, wherein the display device displays RFID tag information received from the RFID tag in response to the interrogate signal. The RFID tag information comprises data describing the aircraft component. The user receives the RFID tag information without interrupting an assembly task.

The RFID data reader glove provides a rapid, technology-enabled method to obtain information from RFID tags, which is one information-related task within the larger domain of all information-related tasks encountered in aircraft touch labor. The RFID data reader glove permits a user to acquire RFID tag information using the movements of the user's gloved hand. In one embodiment, the user acquires the RFID tag data by touching a part that has a RFID tag.

The RFID data reader glove presents RFID tag information to a user while reducing the need for other electronic devices, such as radios, cell phones, notebook, handheld computers, handheld RFID tag readers, light pens, and other input/output devices. Identifying a part by touch removes one of the significant steps in information-related tasks within technical work. It is significant because currently available handheld RFID tag readers frequently require a technician to turn away from a work piece to begin a search of some sort, such as entry of a work order number and then searching through a list of affected parts, or entry of an aircraft tail number and then a search through a list of requisitioned parts. The name or number of a part is often a key requirement in many other information-related tasks; therefore, when the part name or number is known, subsequent steps, checking inventory, ordering a part, requesting an inspection, and collaborating with engineering liaison are more quickly started.

The RFID data reading glove is better than the existing solutions because it does not require a distinct performance (pick up reader, operate reader, observe display, stow reader), to obtain the name, number, or status of a part. Instead, all that is required is that the technician touches a RFID tag or a surface near the tag. The RFID data reading glove may be used to add value to a process where RFID tag reading is incorporated into the normal touch labor activities of technicians.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reducing time expended on tasks during assembly of an aircraft, the method comprising:
    enabling a radio frequency identification tag reading function of a radio frequency identification tag reader integrated into a user glove during the assembly of the aircraft, wherein the radio frequency identification tag reader comprises a set of touch activation components integrated into the user glove;
    responsive to pressing a touch activation component in the set of touch activation components against a surface, transmitting an interrogate signal to a first radio frequency identification tag associated with a first aircraft component, by the radio frequency identification tag reader, during the assembly of the aircraft;
    transmitting an interrogate signal to a second radio frequency identification tag associated with a second aircraft component, the first aircraft component and the second aircraft component having a predetermined location in the aircraft;
    comparing location information for the first component and location information for the second component to determine proper location information;
    receiving location acceptability information of the first aircraft component and the second aircraft component in the aircraft;
    observing a display device coupled to the radio frequency identification tag reader integrated into the user glove, wherein the display device displays radio frequency identification tag information received from the radio frequency identification tag in response to the interrogate signal, and wherein the radio frequency identification tag information comprises data describing the aircraft component, including verification of the component location in the aircraft, and
    wherein the transmitting an interrogate signal and the receiving location acceptability information is provided while a user performs an assembly task such that the user receives the radio frequency identification tag information without interrupting an assembly task.

2. The method of claim 1 wherein the assembly of the aircraft is a task comprising:
    assembling a plurality of parts or subparts to form a component or assembly for utilization in the aircraft.

3. The method of claim 1 wherein the glove comprises a plurality of regions, wherein the touch activation component is integrated into a first region in the plurality of regions, and wherein the touch activation component is activated when the user touches the first region of the glove against the surface.

4. The method of claim 3 wherein the first region is a region of the glove covering the back of a hand of the user, and wherein the touch activation component is activated when the user touches the region of the glove covering the back of the hand to the surface.

5. The method of claim 3, further comprising:
    a second region, wherein the second region is a region of the glove covering a fingertip of the user, and wherein the touch activation component is activated when the user touches the region of the glove covering the fingertip to the surface.

6. The method of claim 3 wherein the glove is worn by a user and wherein the display device is integrated into an optic shield worn by the user.

7. The method of claim 1 wherein the display device is a display screen, and wherein the radio frequency identification tag reader transmits the radio frequency identification tag information to the display screen using a wireless communication protocol.

8. The method of claim 3 wherein the user wears the glove and wherein the display device is attached to the glove.

9. The method of claim 7 wherein the display device attached to a gauntlet of the glove.

10. A method of performing maintenance on an aircraft, the method comprising:
    powering a radio frequency identification tag reading function of a radio frequency identification tag reader integrated into a glove so as to reset and make ready to read the radio frequency identification tag reader, wherein the radio frequency identification tag reader comprises a touch activation component integrated into the glove;
    pressing the touch activation component against a surface to activate a ready-to-read contact event during maintenance on the aircraft while a user performs maintenance on the aircraft;
    responsive to pressing the touch activation component against the surface, transmitting an interrogate signal to a first radio frequency identification tag associated with a first component of the aircraft, by the radio frequency identification tag reader, during maintenance on the aircraft while the user performs maintenance on the aircraft;
    transmitting an interrogate signal to a second radio frequency identification tag associated with a second component of the aircraft, the component and the second component having a predetermined location;
    comparing location information for the first component and location information for the second component to determine proper location information for the first component;
    receiving location acceptability information of the first aircraft component with respect to the aircraft while the user performs maintenance on the aircraft; and
    observing a display device associated with the radio frequency identification tag reader integrated into the glove, by a user wearing the glove, wherein the display device displays radio frequency identification tag information received from the radio frequency identification tag in response to the interrogate signal, and wherein the radio frequency identification tag information comprises maintenance data associated with the component, and wherein the user receives the radio frequency identification tag information without interrupting a maintenance task and performance of value-added tasks.

11. The method of claim 10 wherein the touch activation component is located in a fingertip of the glove.

12. The method of claim 10 wherein the display device is integrated into an optic shield worn by the user.

13. The method of claim 10 wherein the display device is a display screen, and wherein the radio frequency identification tag reader transmits the radio frequency identification tag information to the display screen using a wireless communication protocol.

14. The method of claim 10 wherein the display device is attached to a gauntlet of the glove.

15. The method of claim 10 wherein the maintenance task is a task selected from a group consisting of a manufacturing task, an assembly task, a component testing task, a repair task, a component replacement task, a component inspection task, and a component maintenance task.

16. A method for tracking aircraft components, the method comprising:
    powering a radio frequency identification tag reading function of a radio frequency identification tag reader integrated into a user glove so as to reset and make ready to read the radio frequency identification tag reader, wherein the radio frequency identification tag reader comprises a set of touch activation components integrated into the user glove;
    responsive to pressing a touch activation component in the set of touch activation components against a surface, transmitting an interrogate signal to a first radio frequency identification tag associated with a first aircraft component, by the radio frequency identification tag reader;
    transmitting an interrogate signal to a second radio frequency identification tag associated with a second aircraft component, the first aircraft component and the second aircraft component having a predetermined location in the aircraft;
    receiving location acceptability information of the first aircraft component and the second aircraft component with respect to the aircraft; and
    observing a display device coupled to the radio frequency identification tag reader integrated into the user glove, wherein the display device displays radio frequency identification tag information received from the first radio frequency identification tag and the second radio frequency identification tag in response to the interrogate signal.

17. The method of claim 16 wherein the touch activation component is located in a fingertip of the glove.

18. The method of claim 16 wherein the glove is worn by a user and wherein the display device is integrated into an optic shield worn by the user.

19. A radio frequency identification data reading glove system comprising:
    a radio frequency identification tag readers integrated into a glove;
    a power source;
    a set of touch activation components integrated into a set of fingertips of the glove, wherein a touch activation component in the set of touch activation components is activated when a user presses the touch activation component against a surface of a part during performance of a value-added maintenance task associated with the part;
    an antenna configured to transmit an interrogate signal to a first radio frequency identification tag associated with a first part in response to the user touching a surface of the first part with the touch activation component and an interrogate signal to a second radio frequency identification tag associated with a second part, the first part and the second part having a predetermined location relationship, and wherein the antenna receives location acceptability information of the first part with respect to the second part;
    a computing device configured to compare location information for the first component and location information for the second component to determine a proper location information for the first part with respect to the second part;
    a network interface, wherein the network interface transmits a response signal received from the radio frequency identification tag readers to the computing device for processing, and wherein a result of processing the response signal comprises radio frequency identification tag information, the information including the location acceptability information of the first part with respect to the second part; and
    a display device coupled to the set of radio frequency identification tag readers, wherein the display device is a wrist mounted display screen, wherein the display device presents the radio frequency identification tag information to a user performing the value-added maintenance task, and wherein the user receives the radio frequency identification tag information without interrupting performance of the value-added maintenance task.

20. A method for obtaining information about a component in a vehicle, the method comprising:
    enabling a radio frequency identification tag reading function of a radio frequency identification tag reader integrated into a user glove, wherein the radio frequency identification tag reader comprises a set of touch activation components integrated into the user glove;
    responsive to pressing a touch activation component in the set of touch activation components against a surface, transmitting an interrogate signal to a first radio frequency identification tag associated with a first component, by the radio frequency identification tag reader;
    transmitting an interrogate signal to a second radio frequency identification tag associated with a second component, the first component and the second component having a predetermined relationship;
    comparing location information for the first component and location information for the second component to determine proper location information;
    receiving location acceptability information of the first component with respect to the second component; and
    observing a display device coupled to the radio frequency identification tag reader integrated into the user glove, wherein the display device displays radio frequency identification tag information received from the first radio frequency identification tag and the second radio frequency identification tag in response to the interrogate signal.

* * * * *